(12) United States Patent
Putman et al.

(10) Patent No.: US 12,346,088 B2
(45) Date of Patent: Jul. 1, 2025

(54) SYSTEMS, METHODS, AND MEDIA FOR MANUFACTURING PROCESSES

(71) Applicant: Nanotronics Imaging, Inc., Cuyahoga Falls, OH (US)

(72) Inventors: Matthew C. Putman, Brooklyn, NY (US); Vadim Pinskiy, Wayne, NJ (US); Damas Limoge, Brooklyn, NY (US); Sadegh Nouri Gooshki, Brooklyn, NY (US); Aswin Raghav Nirmaleswaran, Brooklyn, NY (US); Fabian Hough, Brooklyn, NY (US)

(73) Assignee: Nanotronics Imaging, Inc.

(*) Notice: Subject to any disclaimer, the term of this patent is extended or adjusted under 35 U.S.C. 154(b) by 982 days.

(21) Appl. No.: 17/180,422

(22) Filed: Feb. 19, 2021

(65) Prior Publication Data

US 2021/0263495 A1 Aug. 26, 2021

Related U.S. Application Data

(60) Provisional application No. 62/979,639, filed on Feb. 21, 2020.

(51) Int. Cl.
 *G05B 19/406* (2006.01)
 *B29C 64/393* (2017.01)
 (Continued)

(52) U.S. Cl.
 CPC .......... *G05B 19/406* (2013.01); *B29C 64/393* (2017.08); *B33Y 30/00* (2014.12);
 (Continued)

(58) Field of Classification Search
 CPC ........ G05B 19/406; G05B 2219/49023; G05B 19/4099; G05B 2219/32179;
 (Continued)

(56) References Cited

U.S. PATENT DOCUMENTS

| 7,634,151 B2 | 12/2009 | Bergman et al. |
| 10,481,579 B1 | 11/2019 | Putman et al. |

(Continued)

FOREIGN PATENT DOCUMENTS

| CA | 3086483 | 6/2019 |
| CN | 1682165 A | 10/2005 |

(Continued)

OTHER PUBLICATIONS

X. Gui, X. Liu, Q. Tian and W. Guo, "Multimodal Data Fusion in 3-D Printing Quality Prediction," in IEEE Sensors Letters, vol. 3, No. 1, pp. 1-4, Jan. 2019 (Year: 2019).*

(Continued)

*Primary Examiner* — Christopher E. Everett
(74) *Attorney, Agent, or Firm* — DLA PIPER LLP (US)

(57) ABSTRACT

A manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to dynamically adjust processing parameters of each step of the multi-step manufacturing process to achieve a desired final quality metric for the component.

14 Claims, 7 Drawing Sheets

(51) Int. Cl.
*B33Y 30/00* (2015.01)
*B33Y 50/02* (2015.01)
*G06N 3/044* (2023.01)
*G06N 3/08* (2023.01)
*G06N 20/00* (2019.01)

(52) U.S. Cl.
CPC .............. *B33Y 50/02* (2014.12); *G06N 3/044* (2023.01); *G06N 3/08* (2013.01); *G06N 20/00* (2019.01); *G05B 2219/49023* (2013.01)

(58) Field of Classification Search
CPC ........... G05B 2219/32181; G05B 2219/32182; G05B 2219/32187; G05B 2219/32193; G05B 19/41875; G05B 2219/32177; G05B 2219/32194; G05B 2219/32197; G05B 2219/49007; B29C 64/393; B33Y 30/00; B33Y 50/02; G06N 3/044; G06N 3/08; G06N 20/00; G06N 3/084; G06N 3/045; Y02P 10/25; Y02P 90/02; B22F 10/85
See application file for complete search history.

(56) References Cited

U.S. PATENT DOCUMENTS

| | | | |
|---|---|---|---|
| 10,518,354 B2 | 12/2019 | Lin et al. | |
| 2003/0155415 A1* | 8/2003 | Markham | G06Q 50/00 235/376 |
| 2010/0033521 A1 | 2/2010 | Krtchman | |
| 2011/0288837 A1 | 11/2011 | Blevins et al. | |
| 2014/0301179 A1 | 10/2014 | Rich et al. | |
| 2015/0037601 A1* | 2/2015 | Blackmore | B23K 15/002 219/76.1 |
| 2015/0045928 A1 | 2/2015 | Perez et al. | |
| 2015/0324329 A1* | 11/2015 | Blevins | G05B 23/024 |
| 2017/0001379 A1* | 1/2017 | Long | B29C 64/393 |
| 2018/0079125 A1 | 3/2018 | Perez et al. | |
| 2018/0136633 A1 | 5/2018 | Small et al. | |
| 2018/0292811 A1* | 10/2018 | Baseman | G05B 13/0265 |
| 2018/0341248 A1* | 11/2018 | Mehr | G05B 13/048 |
| 2019/0009472 A1 | 1/2019 | Mark | |
| 2019/0118300 A1 | 4/2019 | Penny et al. | |
| 2019/0283333 A1* | 9/2019 | Hwang | G06N 3/045 |
| 2019/0299536 A1 | 10/2019 | Putman et al. | |
| 2020/0247061 A1 | 8/2020 | Putman et al. | |
| 2021/0078076 A1 | 3/2021 | Jurg et al. | |
| 2021/0387421 A1 | 12/2021 | Putman et al. | |
| 2022/0026877 A1 | 1/2022 | Small et al. | |
| 2023/0202120 A1 | 6/2023 | Jurg et al. | |

FOREIGN PATENT DOCUMENTS

| | | |
|---|---|---|
| CN | 105223914 | 1/2016 |
| CN | 108357106 A | 8/2018 |
| CN | 109635875 A | 4/2019 |
| CN | 208705198 | 4/2019 |
| CN | 109919058 A | 6/2019 |
| CN | 110328878 | 10/2019 |
| JP | 6214889 | 9/2017 |
| JP | 2018-8403 | 1/2018 |
| JP | 2018-108717 | 7/2018 |
| JP | 2020-1302 | 1/2020 |
| KR | 20190118300 A | 10/2019 |
| TW | I553436 | 10/2016 |
| TW | I571633 | 2/2017 |
| TW | I616736 | 3/2018 |
| TW | 201908896 A | 3/2019 |
| WO | 201820498 | 11/2018 |

OTHER PUBLICATIONS

Office Action for Taiwan Patent Application No. 111117330, dated Jul. 18, 2023, 4 Pages.
Office Action for Japanese Patent Application No. 2022-549452, dated Sep. 29, 2023, 14 Pages.
PCT International Application No. PCT/US21/18858, International Search Report and Written Opinion of the International Searching Authority, dated Apr. 29, 2021, 9 pages.
First Examination Report for Indian Patent Application No. 202217041544, dated Feb. 2, 2023, 6 Pages.
International Preliminary Report on Patentability for International Application No. PCT/US2021/018858, mailed Sep. 1, 2022, 08 Pages.
Office Action and Search Report from Taiwan Patent Application No. 111117330, dated Apr. 11, 2023, 7 Pages.
Extended European Search Report for Application No. 21757966.3, dated Feb. 21, 2024, 9 pages.
Office Action for Japanese Patent Application No. 2022-549452, dated Mar. 22, 2024, 13 Pages.
Office Action for Taiwan Patent Application No. 112140186, dated Aug. 28, 2024, 19 Pages.
Office Action for Chinese Patent Application No. 202180011676.9, mailed Oct. 22, 2024, 10 pages.
Office Action for Korean Patent Application No. 10-2022-7030062, dated Jan. 9, 2025, 11 Pages.

* cited by examiner

SYSTEMS, METHODS, AND MEDIA FOR MANUFACTURING PROCESSES

CROSS-REFERENCE TO RELATED APPLICATIONS

This application claims priority to U.S. Provisional Application Ser. No. 62/979,639, filed Feb. 21, 2020, which is hereby incorporated by reference in its entirety.

FIELD OF DISCLOSURE

The present disclosure generally relates to a system, method, and media for manufacturing processes.

BACKGROUND

To manufacture specimens that consistently meet desired design specifications safely, timely, and with minimum waste, constant monitoring and adjustment to the manufacturing process is typically required.

SUMMARY

In some embodiments, a manufacturing system is disclosed herein. The manufacturing system includes one or more stations, a monitoring platform, and a control module. Each station of the one or more stations is configured to perform at least one step in a multi-step manufacturing process for a component. The monitoring platform is configured to monitor progression of the component throughout the multi-step manufacturing process. The control module is configured to dynamically adjust processing parameters of each step of the multi-step manufacturing process to achieve a desired final quality metric for the component. The control module configured to perform operations. The operations include receiving, from the monitoring platform, an input associated with the component at a step of the multi-step manufacturing process. The operations further include generating, by the control module, a final quality metric prediction based on the image of the specimen. The operations further include determining, by the control module, that the final quality metric prediction is not within a range of acceptable values. The operations further include, based on the determining, adjusting by the control module, control logic for at least a following station. Adjusting the control logic includes applying a corrective action to be performed by the following station.

In some embodiments, a multi-step manufacturing method is disclosed herein. A computing system receives, from a monitoring platform of a manufacturing system, an image of a specimen at a station of one or more stations. Each station is configured to perform a step of a multi-step manufacturing process. The computing system generates a final quality metric prediction based on the image of the specimen. The computing system determines that the final quality metric prediction is not within a range of acceptable values. Based on the determining, the computing system adjusts control logic for at least a following station, wherein the adjusting comprises applying a corrective action to be performed by the following station.

In some embodiments, a three-dimensional printing system is disclosed herein. The system includes a processing station, a monitoring platform, and a control module. The processing station is configured to deposit a plurality of layers to form a specimen. The monitoring platform is configured to monitor progression of the specimen throughout a deposition process. The control module is configured to dynamically adjust processing parameters for each layer of the plurality of layers to achieve a desired final quality metric for the component. The control module is configured to perform operations. The operations include receiving, from the monitoring platform, an image of a specimen after a layer has been deposited. The operations further include generating, by the control module, a final quality metric prediction based on the image of the specimen. The operations further include determining, by the control module, that the final quality metric prediction is not within a range of acceptable values. The operations further include based on the determining, adjusting by the control module, control logic for at least a following layer to be deposited, wherein the adjusting comprising applying a corrective action to be performed by deposition of the following layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
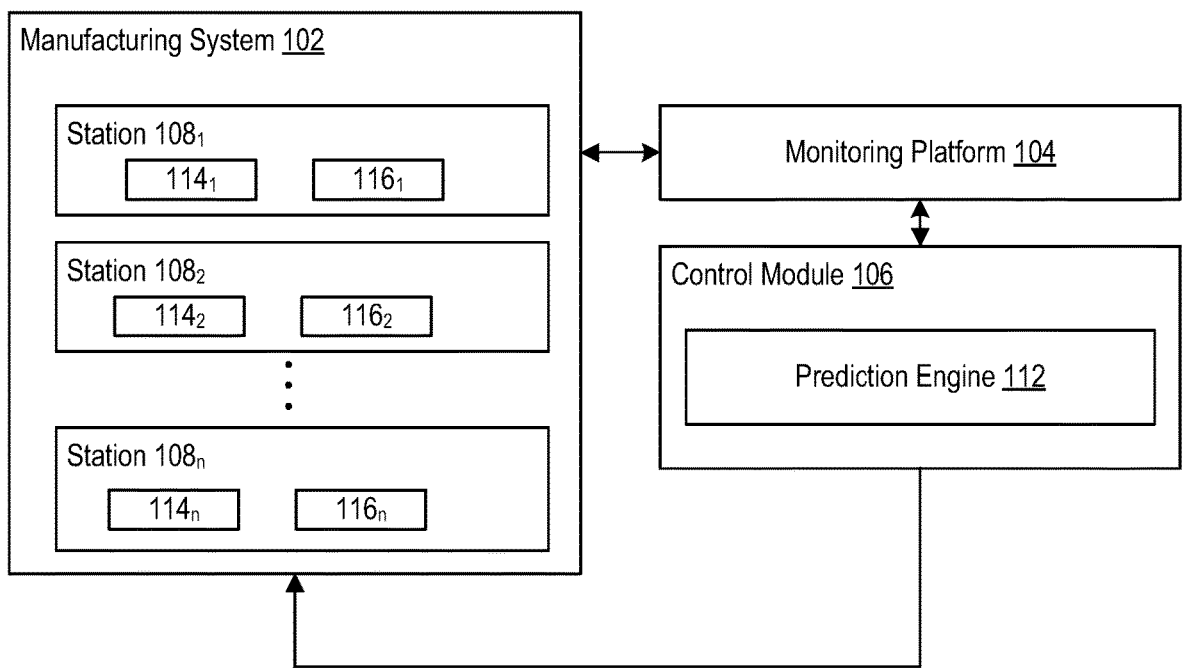
FIG. 1 is a block diagram illustrating a manufacturing environment, according to example embodiments.

One or more techniques described herein are generally directed to a monitoring platform configured to monitor each step of a multi-step manufacturing process. For each step of the multi-step manufacturing process, the monitoring platform may monitor progress of the specimen and determine how a current state of the specimen affects a final quality metric associated with the final specimen. Generally, a final quality metric is a metric that cannot be measured at each step of a multi-step manufacturing process. Exemplary final quality metrics may include, but are not limited to, tensile strength, hardness, thermal properties of the final specimen, and the like. For certain final quality metrics, such as tensile strength, destructive testing is used for measuring such metric.

The one or more techniques described herein are able to project the final quality metric at each step of a multi-step manufacturing process using one or more artificial intelligence techniques. For example, the one or more techniques described herein may leverage unsupervised K-Means clustering and a deep learning network to learn clustering features. High fidelity labels may be created for unreliable feed-forward set-points. Subsequently, this approach may be generalized using a regressor deep learning network to relabel all images. Using the relabeled images, two networks may be trained to predict a quality metric for a specimen at a particular point on the manufacturing process.

Manufacturing processes may be complex and include raw materials being processed by different process stations (or "stations") until a final specimen is produced. In some embodiments, each process station receives an input for processing and may output an intermediate output that may be passed along to a subsequent (downstream) process station for additional processing. In some embodiments, a final process station may receive an input for processing and may output the final specimen or, more generally, the final output.

In some embodiments, each station may include one or more tools/equipment that may perform a set of processes steps. Exemplary process stations may include, but are not limited to, conveyor belts, injection molding presses, cutting machines, die stamping machines, extruders, computer numerical control (CNC) mills, grinders, assembly stations, three-dimensional printers, quality control stations, validation stations, and the like.

In some embodiments, operations of each process station may be governed by one or more process controllers. In some embodiments, each process station may include one or more process controllers that may be programmed to control the operation of the process station. In some embodiments, an operator, or control algorithms, may provide the station controller with station controller setpoints that may represent the desired value, or range of values, for each control value. In some embodiments, values used for feedback or feed forward in a manufacturing process may be referred to as control values. Exemplary control values may include, but are not limited to: speed, temperature, pressure, vacuum, rotation, current, voltage, power, viscosity, materials/resources used at the station, throughput rate, outage time, noxious fumes, and the like.

In some embodiments, a specimen may refer to an output of a manufacturing process. For example, an output of a manufacturing process may be a circuit board that is part of a mobile device, a screen that is part of the mobile device, and/or a completed mobile device.

FIG. 1 is a block diagram illustrating a manufacturing environment 100, according to example embodiments. Manufacturing environment 100 may include a manufacturing system 102, a monitoring platform 104, and a control module 106. Manufacturing system 102 may be broadly representative of a multi-step manufacturing system. In some embodiments, manufacturing system 102 may be representative of a manufacturing system for use in additive manufacturing (e.g., 3D printing system). In some embodiments, manufacturing system 102 may be representative of a manufacturing system for use in subtractive manufacturing (e.g., CNC machining). In some embodiments, manufacturing system 102 may be representative of a manufacturing system for use in a combination of additive manufacturing and subtractive manufacturing. More generally, in some embodiments, manufacturing system 102 may be representative of a manufacturing system for use in a general manufacturing process.

Manufacturing system 102 may include one or more stations $108_1$-$108_n$ (generally, "station 108"). Each station 108 may be representative of a step and/or station in a multi-step manufacturing process. For example, each station 108 may be representative of a layer deposition operation in a 3D printing process (e.g., station $108_1$ may correspond to layer 1, station $108_2$ may correspond to layer 2, etc.). In another example, each station 108 may correspond to a specific processing station. In some embodiments, a manufacturing process for a specimen may include a plurality of steps. In some embodiments, the plurality of steps may include an ordered sequence of steps. In some embodiments, the plurality of steps may include an unordered (e.g., random or pseudorandom) sequence of steps.

Each station 108 may include a process controller 114 and control logic 116. Each process controller $114_1$-$114_n$ may be programmed to control the operation of each respective station 108. In some embodiments, control module 106 may provide each process controller 114 with station controller setpoints that may represent the desired value, or range of values, for each control value. Control logic 116 may refer to the attributes/parameters associated with a station's 108 process steps. In operation, control logic 116 for each station 108 may be dynamically updated throughout the manufacturing process by control module 106, depending on a current trajectory of a final quality metric.

Monitoring platform 104 may be configured to monitor each station 108 of manufacturing system 102. In some embodiments, monitoring platform 104 may be a component of manufacturing system 102. For example, monitoring platform 104 may be a component of a 3D printing system. In some embodiments, monitoring platform 104 may be independent of manufacturing system 102. For example, monitoring platform 104 may be retrofit onto an existing manufacturing system 102. In some embodiments, monitoring platform 104 may be representative of an imaging device configured to capture an image of a specimen at each step of a multi-step process. For example, monitoring platform 104 may be configured to capture an image of the specimen at each station 108. Generally, monitoring platform 104 may be configured to capture information associated with production of a specimen (e.g., an image, a voltage reading, a speed reading, etc.), and provide that information, as input, to control module 106 for evaluation.

Control module 106 may be in communication with manufacturing system 102 and monitoring platform 104 via one or more communication channels. In some embodiments, the one or more communication channels may be representative of individual connections via the Internet, such as cellular or Wi-Fi networks. In some embodiments, the one or more communication channels may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN.

Control module 106 may be configured to control each process controller of manufacturing system 102. For example, based on information captured by monitoring platform 104, control module 106 may be configured to adjust process controls associated with a specific station 108 or processing step. In some embodiments, control module 106 may be configured to adjust process controls of a specific station 108 or processing step based on a projected final quality metric.

Control module 106 may include prediction engine 112. Prediction engine 112 may be representative of one or more machine learning modules trained to project a final quality metric of a specimen based on measured data at each individual step of a multi-step manufacturing process. In operation, control module 106 may receive input from monitoring platform 104. In some embodiments, such input may take the form of an image of a current state of a specimen following a step of the multi-step manufacturing process. Based on the input, control module 106 may project a final quality metric of the specimen. Depending on the projected final quality metric of the specimen, control module 106 may determine one or more actions to take in subsequent manufacturing steps. For example, if the projected final quality metric falls outside of a range of acceptable values, control module 106 may take one or more actions to rectify the manufacturing process. In some embodiments, control module 106 may interface with station controllers in subsequent stations 108 to adjust their respective control and/or station parameters. These adjustments may aid in correcting the manufacturing process, such that the final quality metric may be within the range of acceptable quality metrics.

Figure 2:
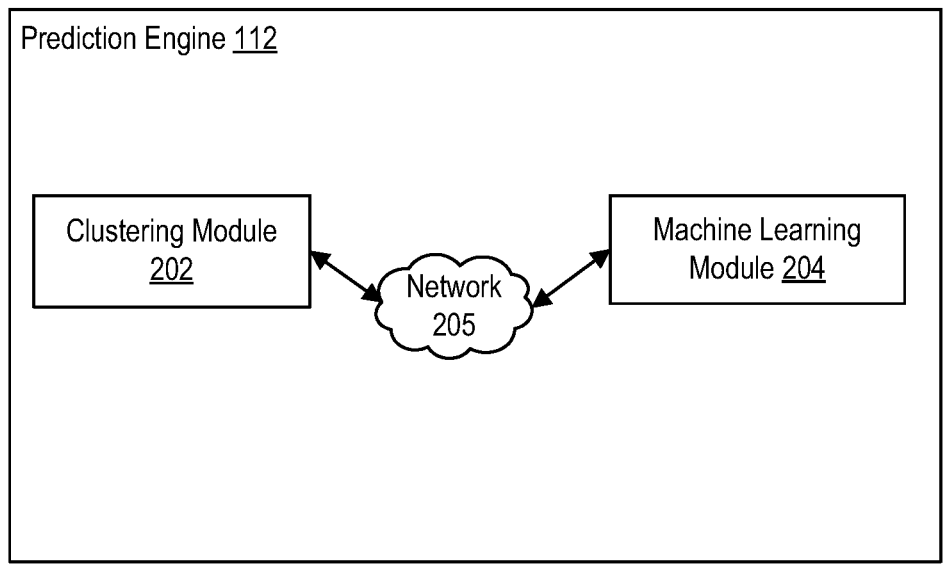
FIG. 2 is a block diagram illustrating prediction engine, according to exemplary embodiments.

FIG. 2 is a block diagram illustrating prediction engine 112, according to exemplary embodiments. As illustrated, prediction engine 112 may include at least a clustering module 202 and a machine learning module 204. Each of clustering module 202 and machine learning module 204 may include one or more software modules. The one or more software modules may be collections of code or instructions stored on a media (e.g., memory of computing systems associated with control module 106) that represent a series of machine instructions (e.g., program code) that implements one or more algorithmic steps. Such machine instructions may be the actual computer code the processor interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions. Further, in some embodiments, each of clustering module 202 and machine learning module 204 may be configured to transmit one or more signals among the components. In such embodiments, such signals may not be limited to machine instructions executed by a computing device.

In some embodiments, clustering module 202 and machine learning module 204 may communicate via one or more local networks 205. Network 205 may be of any suitable type, including individual connections via the Internet, such as cellular or Wi-Fi networks. In some embodiments, network 205 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Clustering module 202 may be configured to assign labels to images of a specimen during a manufacturing process. For example, variability may occur along several dimensions of a manufacturing process. For additive manufacturing, in particular, variability may occur along several dimensions of a print. A station 108 may receive one or more parameters regarding instructions for a manufacturing step in the manufacturing process. For example, in additive manufacturing, manufacturing system 102 may utilize code (e.g., G-code) provided by control module 106, which may contain one or more parameters, $x_{i,j}$, $y_{i,j}$, $z_{i,j}$, $e_{i,j}$, and $f_{i,j}$ for the $j^{th}$ instruction on the $i^{th}$ layer, where $x_{i,j}$, $y_{i,j}$, $z_{i,j}$ are positional set points, $e_{i,j}$ may represent a length of filament to be extruded for a particular print move, and $f_{i,j}$ may represent the speed at which the printer head moves. In some embodiments, the code may also include meta instructions temperature control or axis homing.

In some embodiments, such as those utilizing additive manufacturing, to correlate a final quality metric (e.g., tensile strength) to layer images, a deviation coefficient for each layer, $\gamma_{e,i,j}$, may be established such that:

$$\hat{e}_{i,j} = \gamma_{e,i,j} e_{i,j}$$

where $\hat{e}_{i,j}$ may represent a resulting apparent extrusion for a print move. Each extrusion value, $e_{i,j}$ may have a resulting modifier, $\gamma_{e,i,j}$. Such resulting modifier may be averaged across layers in an abstraction defined as:

$$\gamma_{e,i} = \frac{1}{N} \sum_{j=0}^{N} \gamma_{e,i,j}$$

for N print moves in a layer. Therefore, the extrusion deviation may be assessed for an entire layer by measuring the average deviation coefficient, $\gamma_{e,i}$. For a perfectly performing manufacturing system 102 or station 108, $\gamma_{e,i}=1.0$; however, naturally occurring variation may ensure that this is not the case. In some embodiments, to correlate natural variations to a final quality metric (e.g., tensile strength), these set-points may be artificially perturbed, with an assumption of unreliability for its label.

In some embodiments, the extrusion coefficient $\gamma_{e,i}$ may be a parameter that directly affects the quality outcome of the manufactured part in additive manufacturing. In some embodiments, rather than an extrusion coefficient, oxygen/carbon dioxide content of an out-gas stream from a chemical manufacturing process may be used. In some embodiments, an ellipsometry measurement of a thin-film deposition may be used. A vector of extrusion coefficients, $\Gamma_e = [\gamma_{e,0}, \ldots, \gamma_{e,N}]^T$ may be established. In some embodiments, a vector of speed coefficients, as deviations from a normal baseline, may be used in similar fashion, $\Gamma_f = [\gamma_{f,0}, \ldots, \gamma_{f,N}]^T$. These vectors may act as arguments to a function for the chosen quality metric. In some embodiments in which the chosen quality metric is tensile strength, $t_s$:

$$t_s = f(\Gamma_e, \Gamma_f)$$

where the exact formulation of $f(\cdot)$ may be unknown and an approximation is to be learned by clustering module 202.

In some embodiments, measuring an outcome of a chosen set point, such as $\gamma_{e,i}$, directly may not be feasible. Accordingly, clustering module 202 may be configured to estimate a deviation coefficient, $\gamma_{e,i}$, for a station 108. Such estimation may be devised as:

$$\hat{\gamma}_{e,i} = h(I_i, \theta_h)$$

where $\hat{\gamma}_{e,i}$ may be representative of an estimate of $\gamma_{e,i}$, $I_i$ may be representative of a top-down image of the $i^{th}$ layer, and $\theta_h$ may be representative of the learned parameters for the mapping function, $h(\cdot)$.

Clustering module 202 may utilize an end-to-end clustering method that may be trained to learn both the parameters of a neural network generating feature vectors and cluster assignments of the resulting feature vectors simultaneously. In some embodiments, K-means clustering techniques may be used to partition data-points into K groups of clusters, wherein each data-point may below to the cluster with the nearest mean, thus enabling unsupervised, auto-generative labeling. In some embodiments, convolutional and pooling layers may be used sequentially in the network to extract features from images followed by one or more fully connected network layers through which back-propagation may be used. In some embodiments, K-means clustering assignments on the feature vectors may be used as labels to calculate the gradients for updating a neural network.

Figure 3:
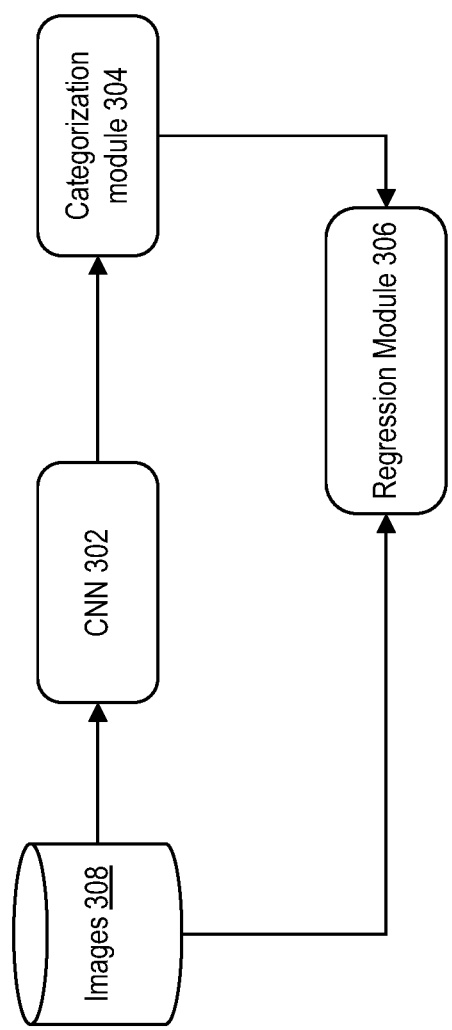
FIG. 3 is a block diagram illustrating an exemplary architecture of clustering module, according to exemplary embodiments.

FIG. 3 is a block diagram illustrating an exemplary architecture of clustering module 202, according to exemplary embodiments. As shown, clustering module 202 may include a convolutional neural network 302, categorization module 304, and a regression module 306.

Convolutional neural network 302 may receive, as input, one or more input images from an image collection 308. In some embodiments, one or more input images for training may be representative of actual images captured by monitoring platform 104 and/or synthetically generated images. Convolutional neural network 302 may be trained to extract feature vectors from each of the one or more input images. For example, convolutional neural network 302 may be trained as a minimization of the variance within the resulting K clusters, given a feature vector produced by convolutional neural network 302.

Categorization module 304 may be configured to receive, as input, the one or more feature vectors extracted by convolutional neural network 302. Categorization module 304 may be configured to apply K-means clustering to the one or more feature vectors to categorize the features. In some embodiments, the fit of the clusters may be used to calculate the gradients for back-propagation. In some embodiments, the clusters may be calculated by both K-means clustering of categorization module 304 and forward propagation of convolutional neural network 302. In some embodiments, the accuracy of convolutional neural network 302 in predicting an assigned cluster label for all images may be calculated. The clustered image groups with the highest accuracy from Z iterations may be chosen for further use.

Regression module 306 may be configured to generate a deviation score for an image. For example, regression module 306 may use an input of the feature vectors produced by the convolutional neural network 302 to generate a deviation score for an image. In some embodiments, regression module 306 may be trained by gathering labels through a voting process achieved with K-means clustering. In some embodiments, the clustering dataset may use images from a process that was artificially perturbed with known deviation coefficients, but the unreliability of the process adds uncertainty to these as pure labels. For every cluster, the modal value of the known deviation coefficients may be applied as a label to the group. Regression module 306 may then be trained using an input of the feature vectors generated by convolutional neural network 302 and a label of the modal cluster value associated with that feature vector. In this manner, clustering module 202 can input an image to convolutional neural network 302, use the output feature vector as an input to regression module 306, which then may output a deviation score for the image.

In some embodiments, regression module 306 may include a plurality of fully connected layers that may utilize linear activation functions.

Using clustering module 202, new set of data pairs may be generated for each image. The new label assignment using visual features may help mitigate issues found in the conventional use of unreliable set-points that proved insufficient for supervised learning. The mapping function may be approximated using a deep neural network with weights, $\theta_h$, and a new set of extrusion labels, $\hat{\Gamma}_e = [\hat{\gamma}_{e,0}, \ldots, \hat{\gamma}_{e,N}]^T$, may be estimated using the trained network, $h(I_i, \theta_m)$. In some embodiments, the higher fidelity labels may be used for further predictive training.

Referring back to FIG. 2, machine learning module 204 may be configured to predict a final quality metric for a specimen in a manufacturing process based on an image of a specimen at a station 108 and one or more labels associated with the image. In some embodiments, the set point labels, $\hat{\Gamma}_e$, may be used to train machine learning module 204. In some embodiments, machine learning module 204 may be representative of a fully connected neural network. In some embodiments, machine learning module 204 may be representative of a gated recurrent unit with internal attention mechanism. Machine learning module 204 may be configured to map $t_s = f(\Gamma_e, \Gamma_f)$ using the higher fidelity labels of $\hat{\gamma}_{e,i} = h(I_i, \theta_h)$. This may be rewritten as:

$$\hat{t}_s = g(\hat{\Gamma}_e, \Gamma_f, \theta_t)$$

where $\hat{t}_s$ may be presentative of the predicted tensile strength and $\theta_t$ may be representative of the learned parameters of the prediction function $g(\cdot)$.

Once fully trained, prediction engine 112 may use machine learning module 204 for making predictions related to the final quality metric of a specimen. Clustering module 202 may be utilized when an end user or administrator wants to retrain prediction engine 112.

Figure 4:
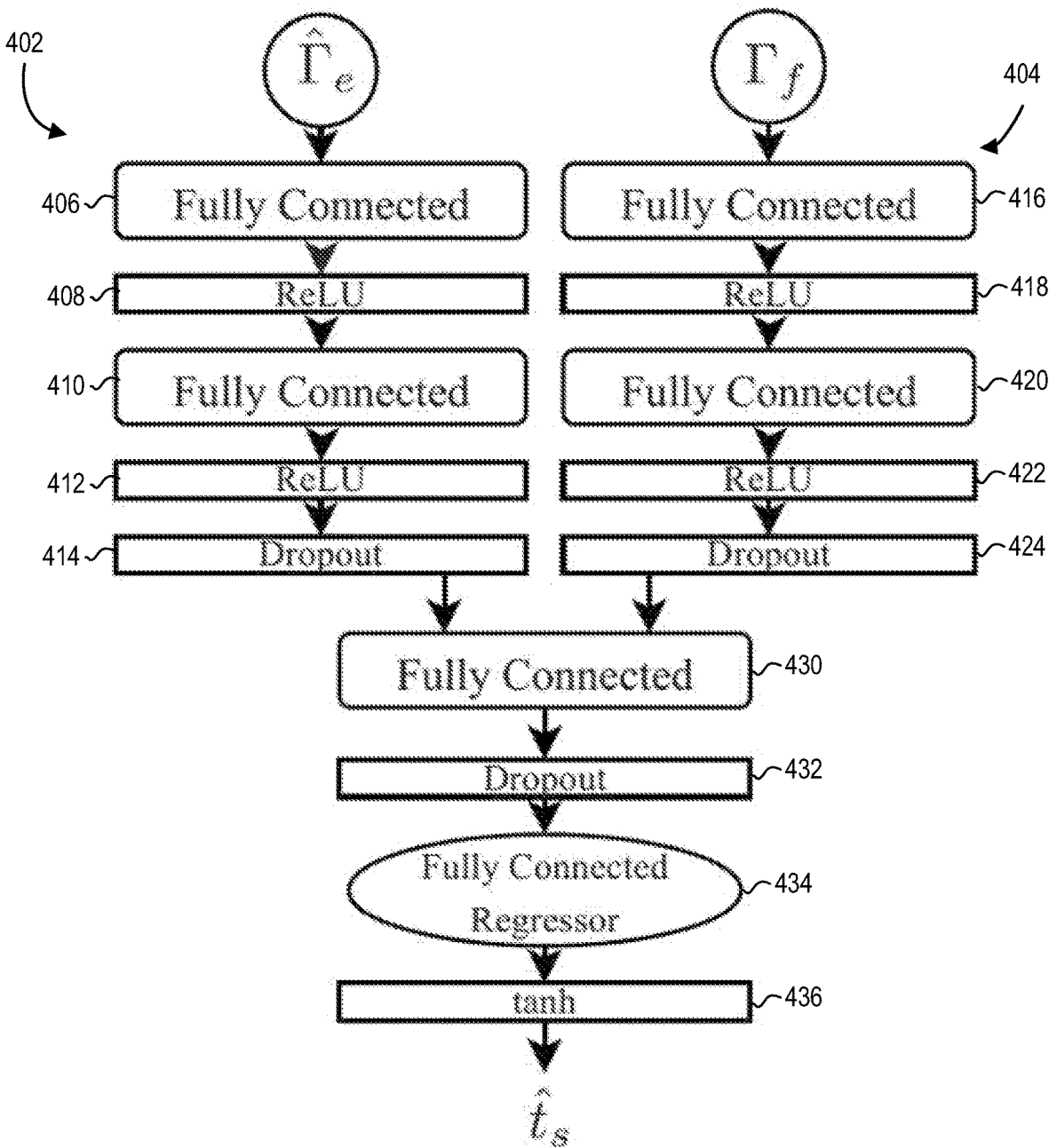
FIG. 4 is a block diagram illustrating an architecture of machine learning module, according to example embodiments.

FIG. 4 is a block diagram illustrating an architecture of machine learning module 204, according to example embodiments. As shown and previously discussed, machine learning module 204 may be representative of a fully connected neural network.

As shown, machine learning module 204 may include a branch-merging architecture 400 that utilizes fully-connected layers with ReLU activation. Architecture 400 may take advantage of transforming $\hat{\Gamma}_e$ and $\Gamma_f$ into higher dimensions separately before passing them into a series of fully-connected layers that compress the prediction value, $\hat{t}_s$, trained on labels of measured tensile strength, $\hat{t}_s$.

As provided, architecture 400 may include a first branch 402 and a second branch 404. First branch 402 may receive, as input, $\hat{\Gamma}_e$. Input, $\hat{\Gamma}_e$, may be provided to a first fully connected layer 406. The output from fully connected layer 406 may be provided to a recurrent linear activation function (ReLU) 408. Output from ReLU 408 may be passed to a second fully connected layer 410, followed by a second ReLU 412, and a dropout layer 414.

Second branch 404 may receive, as input, $\Gamma_f$. Similarly, Input, $\Gamma_f$, may be provided to a first fully connected layer 416. The output from fully connected layer 416 may be provided to ReLU 418. Output from ReLU 418 may be passed to a second fully connected layer 420, followed by a second ReLU 422, and a dropout layer 424.

Outputs from each branch 402 and 404 may be merged and provided, as input, to fully connected layer 430. Output from fully connected layer 430 may be provided to dropout layer 432. Output from ReLU 432 may be passed to a fully connected regressor 434, followed by a tanh activation function 436. The output from machine learning module 204 may be a prediction value, $\hat{t}_s$.

Figure 5:
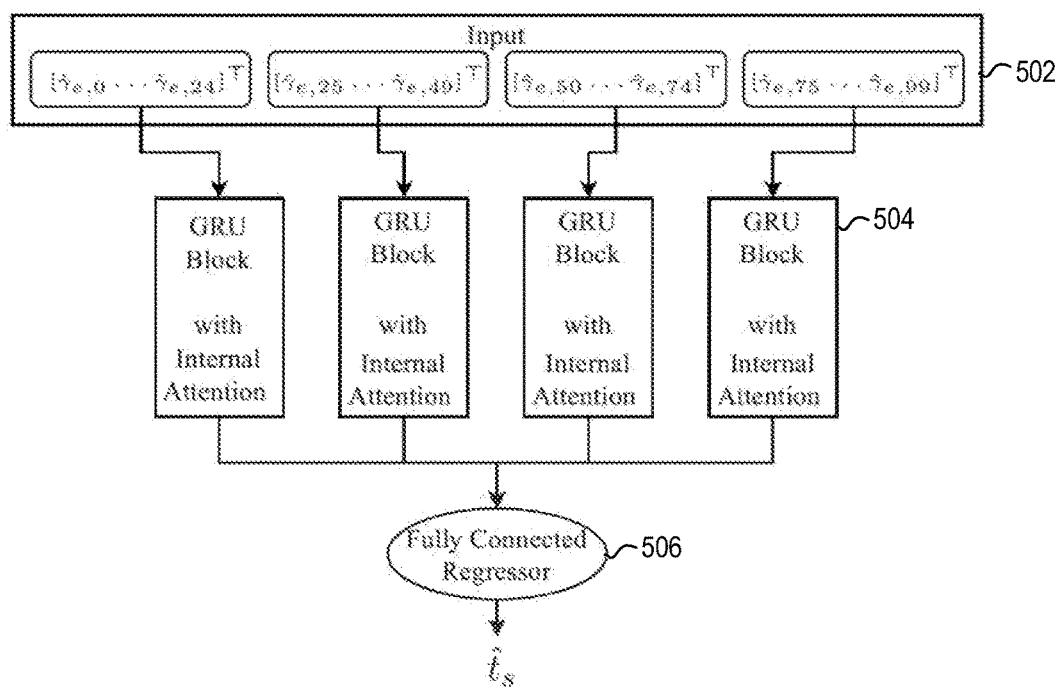
FIG. 5 is a block diagram illustrating an architecture of machine learning module, according to example embodiments.

FIG. 5 is a block diagram illustrating an architecture of machine learning module 204, according to example embodiments. As shown and previously discussed, machine learning module 204 may be representative of a gated recurrent unit with internal attention mechanism.

As shown, machine learning module 204 may include a gated recurrent unit architecture 500. Gated recurrent unit may be configured to predict a final quality metric (e.g., tensile strength, $\hat{E}_s$) given $\hat{\Gamma}_e$ and $\Gamma_f$. Architecture 500 may be used since it performs well with sequential data and is able to hold information about faulty layers through its prediction value.

Input 502 may include $\hat{\Gamma}_e$ and $\hat{\Gamma}_f$ values of the critical layers of a specimen or critical process steps for a specimen. For example, in a manufacturing process, there may be process steps that contribute more to the final quality metric than others. The identification of these steps can be done through correlative or theoretical analysis. In the case of the additive manufacturing, the stress experienced during a tensile pull will be highest for the layer of the smallest surface area. Therefore, a region of layers may be defined which, under normal deviation of extrusion, may fit that definition. These layers or steps may be referred to as "critical layers" or "critical steps." In some embodiments, input labels used were the estimated $\hat{\Gamma}_e$ values from the output of clustering module 202. In some embodiments, the sequence of data for each specimen may be divided or distributed based on a number of gated recurrent unit blocks used. As shown in the embodiments of FIG. 5, input 502 may be divided into four sets, corresponding to four gated recurrent unit blocks 504. Each set of data may be provided to a respective gated recurrent unit block 504.

In some embodiments, the output from each gated recurrent unit blocks 504 may be concatenated and passed to a fully connected layer 506 and regressor output layer 508 to estimate a continuous value corresponding to a final quality metric, e.g., tensile strength, $\hat{t}_s$.

Figure 6:
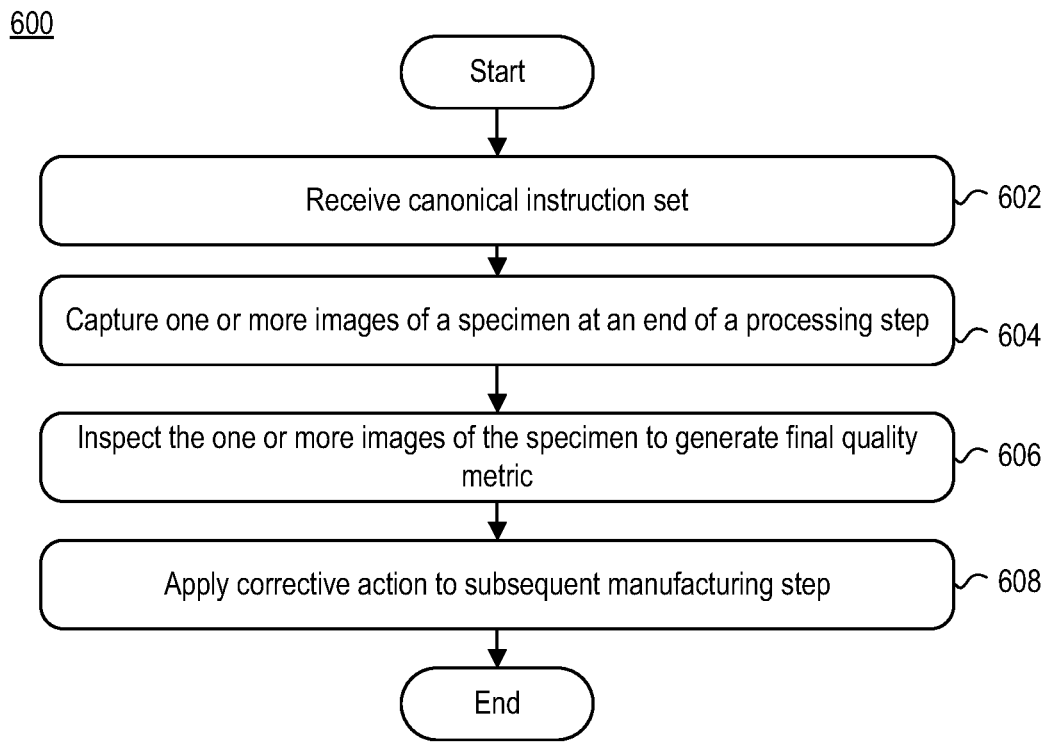
FIG. 6 is a flow diagram illustrating a method of correcting a performing a multi-step manufacturing process, according to example embodiments.

FIG. 6 is a flow diagram illustrating a method 600 of correcting a performing a multi-step manufacturing process, according to example embodiments. Method 600 may begin at step 602.

At step 602, a canonical instruction set may be provided to manufacturing system 102. Canonical instruction set may be representative of a set of instructions for a manufacturing process. In some embodiments, a canonical instruction set may be provided to each station 108. In such embodiments, each canonical instruction set may dictate the processing parameters for a specific manufacturing step corresponding to a respective station 108.

At step 604, monitoring platform 104 may capture an image of a specimen at an end of a processing step of a multi-step process. For example, monitoring platform 104 may be configured to capture an image of the specimen following processing at a respective station 108. In some embodiments, monitoring platform 104 may be configured to capture information associated with production of a specimen (e.g., an image, a voltage reading, a speed reading, etc.), and provide that information, as input, to control module 106 for evaluation.

At step 606, prediction engine 112 may inspect the one or more images of the specimen. For example, prediction engine 112 may receive input (e.g., one or more images) of the specimen at the end of a particular processing step from monitoring platform 104. Using the input, prediction engine 112 may generate a projected final quality metric for the specimen.

At step 608, a corrective action may be applied to a subsequent manufacturing step. For example, based on the projected final quality metric, control module 106 may instruct a given station 108 to adjust one or more processing parameters that correspond to the corrective action to be applied.

Figure 7A:
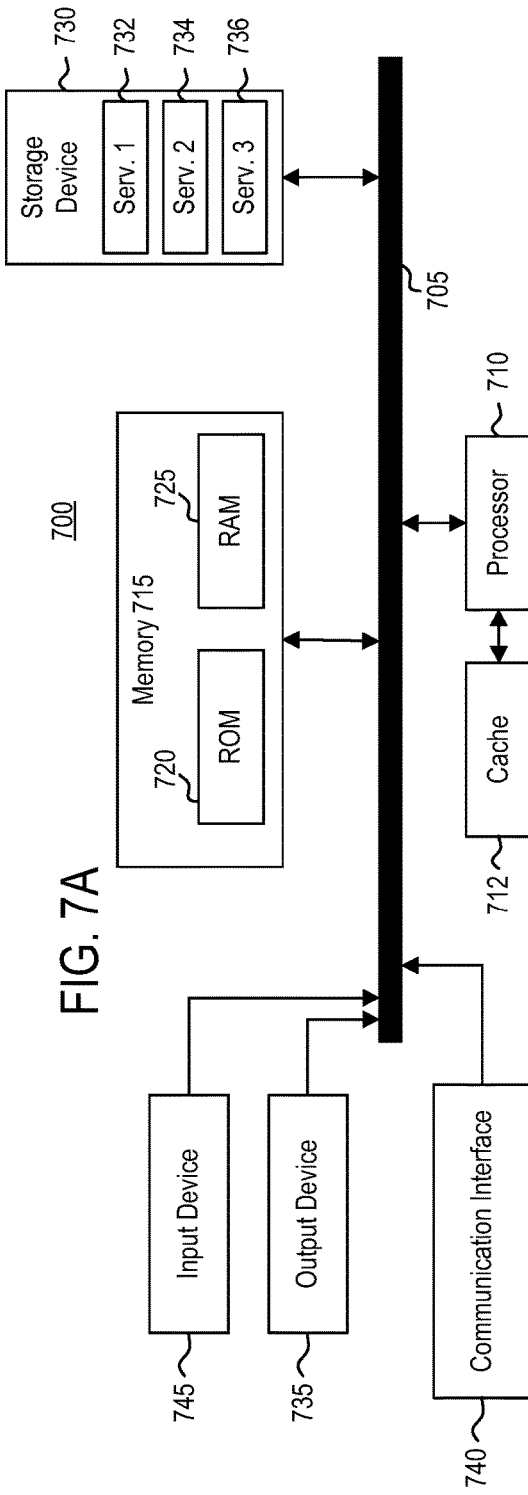
FIG. 7A illustrates a system bus computing system architecture, according to example embodiments.

FIG. 7A illustrates a system bus computing system architecture 700, according to example embodiments. One or more components of system 700 may be in electrical communication with each other using a bus 705. System 700 may include a processor (e.g., one or more CPUs, GPUs or other types of processors) 710 and a system bus 705 that couples various system components including the system memory 715, such as read only memory (ROM) 720 and random access memory (RAM) 725, to processor 710. System 700 can include a cache of high-speed memory connected directly with, in close proximity to, or integrated as part of processor 710. System 700 can copy data from memory 715 and/or storage device 730 to cache 712 for quick access by processor 710. In this way, cache 712 may provide a performance boost that avoids processor 710 delays while waiting for data. These and other modules can control or be configured to control processor 710 to perform various actions. Other system memory 715 may be available for use as well. Memory 715 may include multiple different types of memory with different performance characteristics. Processor 710 may be representative of a single processor or multiple processors. Processor 710 can include one or more of a general purpose processor or a hardware module or software module, such as service 1 732, service 2 734, and service 3 736 stored in storage device 730, configured to control processor 710, as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing device 700, an input device 745 which can be any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with computing device 700. Communications interface 740 can generally govern and manage the user input and system output. There is no restriction on operating on any particular hardware arrangement and therefore the basic features here may easily be substituted for improved hardware or firmware arrangements as they are developed.

Storage device 730 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 725, read only memory (ROM) 720, and hybrids thereof.

Storage device 730 can include services 732, 734, and 736 for controlling the processor 710. Other hardware or software modules are contemplated. Storage device 730 can be connected to system bus 705. In one aspect, a hardware module that performs a particular function can include the software component stored in a computer-readable medium in connection with the necessary hardware components, such as processor 710, bus 705, display 735, and so forth, to carry out the function.

Figure 7B:
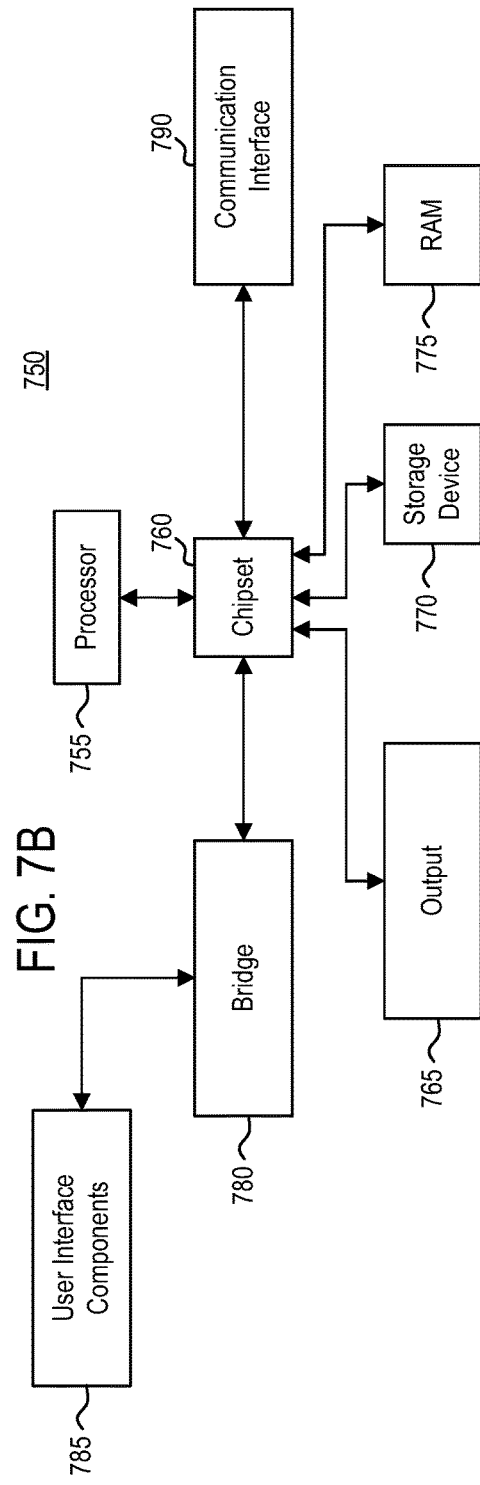
FIG. 7B illustrates a computer system having a chipset architecture, according to example embodiments.

FIG. 7B illustrates a computer system 750 having a chipset architecture, according to example embodiments. Computer system 750 may be an example of computer hardware, software, and firmware that can be used to implement the disclosed technology. System 750 can include one or more processors 755, representative of any number of physically and/or logically distinct resources capable of executing software, firmware, and hardware configured to perform identified computations. One or more processors 755 can communicate with a chipset 760 that can control input to and output from one or more processors 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 755 analyzing data stored in storage 770 or 775. Further, the machine can receive inputs from a user through user interface components 785 and execute appropriate functions, such as browsing functions by interpreting these inputs using one or more processors 755.

It can be appreciated that example systems 700 and 750 can have more than one processor 710 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A manufacturing system, comprising:
one or more stations, each station configured to perform at least one step in a multi-step manufacturing process for a specimen;
a monitoring platform configured to monitor progression of the specimen throughout the multi-step manufacturing process; and
a control module configured to dynamically adjust processing parameters of each step of the multi-step manufacturing process to achieve a desired final quality metric for the specimen, the control module configured to perform operations, comprising:
receiving, from the monitoring platform, an image of the specimen at a step of the multi-step manufacturing process;
extracting a feature vector from the image of the specimen;
generating, by the control module using a convolutional neural network, a final quality metric prediction based on the image of the specimen and the feature vector, wherein a final quality metric is a metric associated with a property of a completed specimen that cannot be measured until each step of the multi-step manufacturing process is complete;
determining, by the control module, that the final quality metric prediction is not within a range of acceptable values; and
based on the determining, adjusting by the control module, control logic for at least a following station, wherein the adjusting comprises applying a corrective action to be performed by the following station.

2. The manufacturing system of claim 1, wherein the operations further comprise:
training the convolutional neural network to generate the final quality metric prediction based on a plurality of images of a plurality of specimens.

3. The manufacturing system of claim 2, wherein the operations further comprise:
training a clustering module to label a plurality of images of a plurality of specimens for training of the convolutional neural network configured to generate the final quality metric prediction based on the plurality of images.

4. The manufacturing system of claim 1, wherein adjusting by the control module, the control logic for at least the following station, comprises:
adjusting a further control logic for a further following station.

5. The manufacturing system of claim 1, wherein each of the one or more stations correspond to a layer deposition in a 3D printing process.

6. A multi-step manufacturing method, comprising:
receiving, by a computing system from a monitoring platform of a manufacturing system, an image of a specimen at a station of one or more stations, each station configured to perform a step of a multi-step manufacturing process;
extracting a feature vector from the image of the specimen;
generating, by the computing system using a convolutional neural network, a final quality metric prediction based on the image of the specimen and the feature vector, wherein a final quality metric is a metric associated with a property of a completed specimen that cannot be measured until each step of the multi-step manufacturing process is complete;
determining, by the computing system, that the final quality metric prediction is not within a range of acceptable values; and
based on the determining, adjusting, by the computing system, control logic for at least a following station, wherein the adjusting comprising a corrective action to be performed by the following station.

7. The multi-step manufacturing method of claim 6, further comprising:
training the convolutional neural network to generate the final quality metric prediction based on a plurality of images of a plurality of specimens.

8. The multi-step manufacturing method of claim 7, further comprising:
training a clustering module to label a plurality of images of a plurality of specimens for training of the convolutional neural network configured to generate the final quality metric prediction based on the plurality of images.

9. The multi-step manufacturing method of claim 6, wherein adjusting, by the computing system, the control logic for at least the following station, comprises:
adjusting a further control logic for a further following station.

10. The multi-step manufacturing method of claim 6, wherein each of the one or more stations correspond to a layer deposition in a 3D printing process.

11. A three-dimensional (3D) printing system, comprising:
a processing station configured to deposit a plurality of layers to form a specimen;
a monitoring platform configured to monitor progression of the specimen throughout a deposition process; and
a control module configured to dynamically adjust processing parameters for each layer of the plurality of layers to achieve a desired final quality metric for the specimen, the control module configured to perform operations, comprising:
receiving, from the monitoring platform, an image of the specimen after a layer has been deposited;
extracting a feature vector from the image of the specimen;
generating, by the control module using a convolutional neural network, a final quality metric prediction based on the image of the specimen and the feature vector, wherein a final quality metric is a metric associated with a property of a completed specimen that cannot be measured until each layer of the plurality of layers has been deposited;
determining, by the control module, that the final quality metric prediction is not within a range of acceptable values; and
based on the determining, adjusting, by the control module, control logic for at least a following layer to be deposited, wherein the adjusting comprising a corrective action to be performed by deposition of the following layer.

12. The 3D printing system of claim 11, wherein the operations further comprise:
training the convolutional neural network to generate the final quality metric prediction based on a plurality of images of a plurality of specimens.

13. The 3D printing system of claim 12, wherein the operations further comprise:
training a clustering module to label a plurality of images of a plurality of specimens for training of the convolutional neural network configured to generate the final quality metric prediction based on the plurality of images.

14. The 3D printing system of claim 11, wherein adjusting, by the control module, the control logic for at least the following layer, comprises:
adjusting a further control logic for a further following layer.

* * * * *